United States Patent [19]

DeAnda et al.

[11] 4,406,041

[45] Sep. 27, 1983

[54] ANTI-TELESCOPING CABLE CLAMP ASSEMBLY FOR WIRE BUNDLES

[75] Inventors: Alfonso DeAnda, Kent; Leon R. Harris, Renton, both of Wash.

[73] Assignee: The Boeing Company, Seattle, Wash.

[21] Appl. No.: 261,351

[22] Filed: May 7, 1981

[51] Int. Cl.³ .................................................. F16G 11/04
[52] U.S. Cl. ................................. 24/115 R; 24/16 PB; 24/122.6; 24/135 K; 339/103 R; 174/135
[58] Field of Search ............ 24/16 PB, 135 R, 135 A, 24/135 K, 135 N, 122.6, 115 R; 339/103 R, 103 B, 103 C, 103 M, 104; 174/135

[56] References Cited

U.S. PATENT DOCUMENTS

| | | | |
|---|---|---|---|
| 1,636,973 | 7/1927 | White | 339/104 |
| 1,882,856 | 10/1932 | Meuer | 339/103 B |
| 2,056,180 | 10/1936 | Flood | 24/115 R |
| 3,198,689 | 8/1965 | Lansing | 49/500 |
| 3,238,580 | 3/1966 | Arai | 24/16 PB |
| 3,324,234 | 6/1967 | Hervig | 174/135 |
| 3,514,815 | 6/1970 | Evans | 24/16 PB |
| 3,518,727 | 7/1970 | Eberle et al. | 24/16 PB |
| 3,633,155 | 1/1972 | Taylor | 339/104 |
| 3,943,608 | 3/1976 | Farkas | 24/16 PB |

Primary Examiner—John J. Wilson
Attorney, Agent, or Firm—Conrad O. Gardner; B. A. Donahue

[57] ABSTRACT

An anti-telescoping cable clamp assembly for mounting and securing wire bundles. A strip of resilient material is coiled about a wire bundle inside a cable clamp assembly associated with an electrical connector. The strip of resilient material has first and second sides which include longitudinal side walls which define a channel therebetween, the channel providing a track for the tape to follow during build-up of the winding around the wire bundle and further preventing telescoping subsequent to assembly of the cable clamp about coiled strip of resilient material surrounding the wire bundle.

3 Claims, 8 Drawing Figures

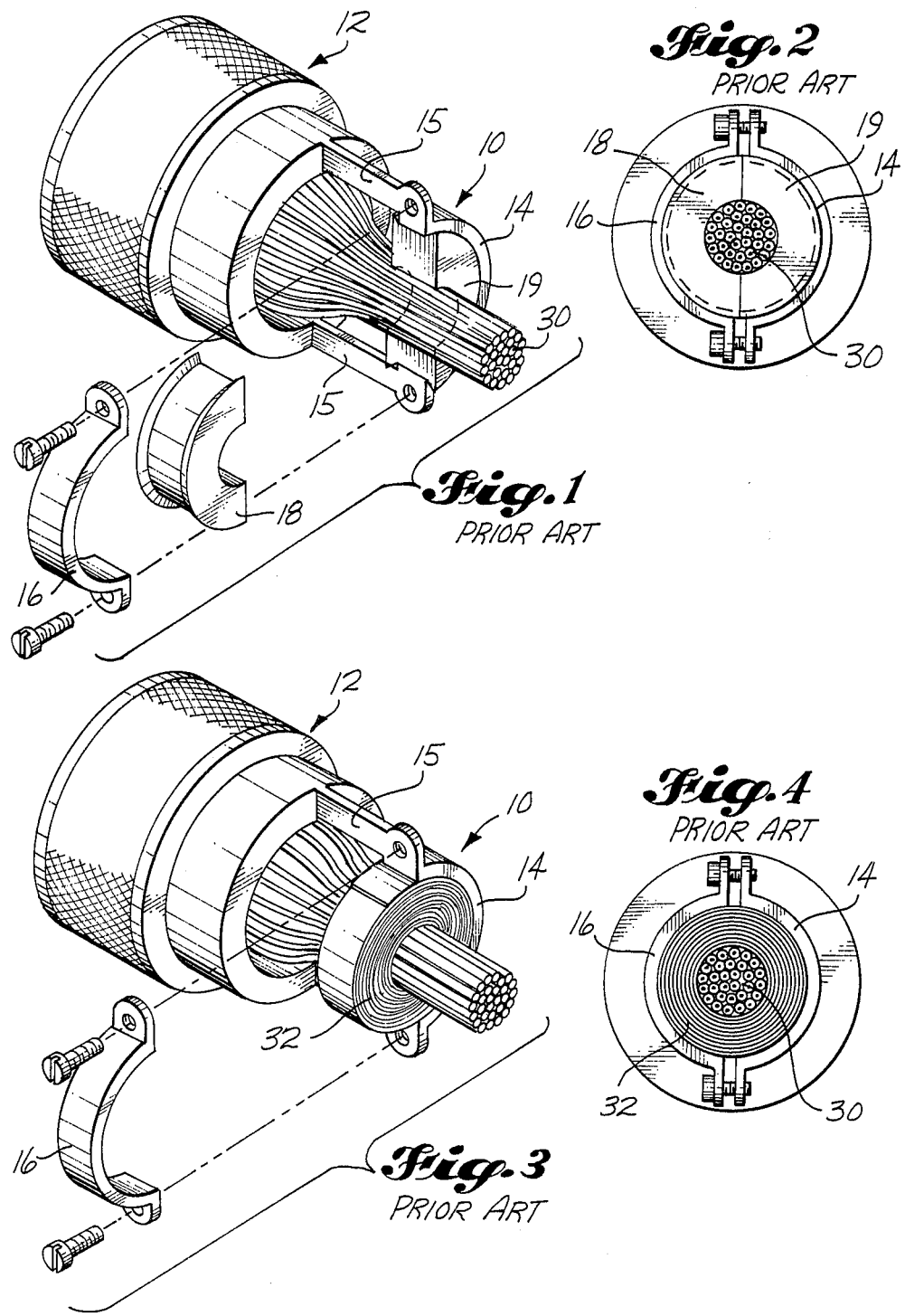

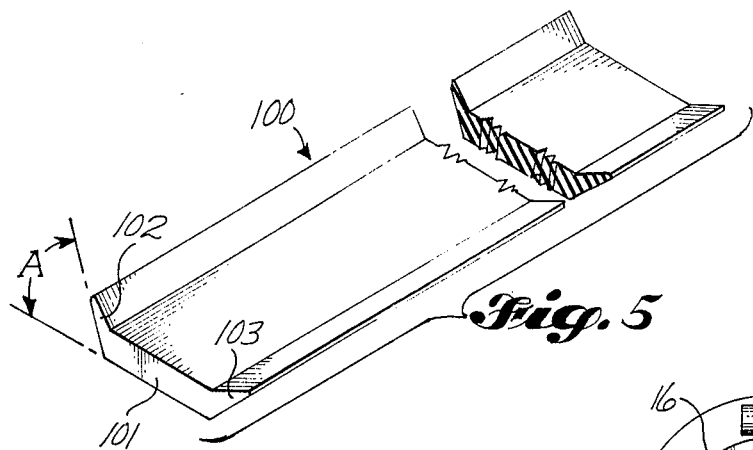
Fig. 5
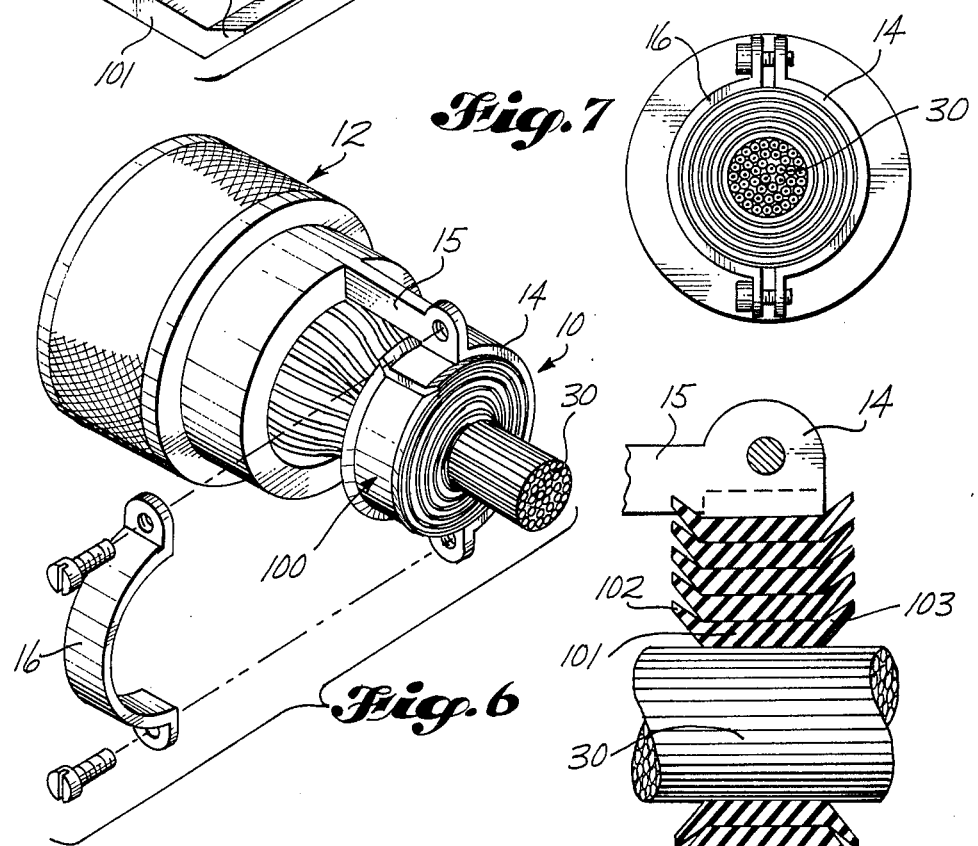
Fig. 7
Fig. 6
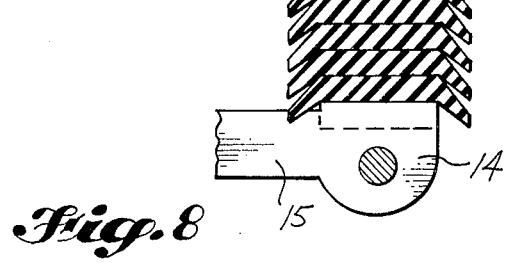
Fig. 8

ANTI-TELESCOPING CABLE CLAMP ASSEMBLY FOR WIRE BUNDLES

This invention relates to cable clamp assemblies for wire bundles and more particularly to an anti-telescoping cable clamp assembly for wire bundles.

Heretofore, the patent literature has shown in U.S. Pat. No. 3,518,727 bundle ties which are adapted to overlap and are configured in a particular manner for such purposes. An interlocking configuration is disclosed which is somewhat complex and costly.

In actual practice, cable clamps associated with electrical connectors have had an undesirable free space within the cable clamp which permitted movement of the wire bundle, and inadequate support thereof. Normally filler material, grommets, or continuous wrapping of tape about the wire bundle until a desired cross-sectional area was obtained were unsatisfactory attempts to solve the problem.

It is accordingly an object of the present invention to provide cable assembly clamping means for filling the interior region between the clamp and wire bundle in a manner preventing telescoping.

It is a further object of the present invention to provide a coiled strip winding of resilient material between the wire bundle and cable clamp associated with an end connector which resilient tape includes side gussets which form a natural track for tape build-up and prevention of telescoping.

Other features and objects of the invention will be apparent from the following detailed description when read with the accompanying drawings.

In the drawings:

FIG. 1 is a perspective view of a prior art cable clamp with associated electrical connector in which the saddle of the cable clamp (backshell) is shown prior to assembly around the wire bundle and in which the cross section area of the wire bundle is surrounded with a filler material for build-up between the wire bundle and the backshell portion of the cable clamp assembly;

FIG. 2 is an end view of the cable clamp assembly of FIG. 1 showing filler material surrounding the wire bundle;

FIG. 3 is a perspective view of a further prior art electrical connector with associated cable clamp shown disassembled and in which tape is wound to fill the volume between wire bundle and clamp;

FIG. 4 is an end view of the prior art cable clamp assembly of FIG. 3 showing in more detail the tape winding to provide build-up as shown in FIG. 3;

FIG. 5 is a perspective view with section taken to show the configuration of the present tape with side gussets for preventing telescoping between wire bundle and clamp assembly;

FIG. 6 is a perspective view of the present anti-telescoping cable clamp assembly for wire bundles;

FIG. 7 is an end view of the anti-telescoping cable clamp assembly for wire bundles shown in FIG. 6; and, FIG. 8 is a sectional view through the clamp portion of the clamp-electrical connector assembly of FIG. 6 showing the build-up of side-gusseted tape of FIG. 5 within the clamp assembly intermediate the wire bundle and clamp.

Turning now to FIG. 1, it can be seen that the prior art clamp means 10 associated with an electrical connector portion 12 comprises two generally opposed looped clamp portions 14 and 16, the looped clamp portion 14 having leg portions 15 for supporting looped clamp portion 14 as an extension of electrical connector 12. Clamp means 10 includes a further looped clamp portion 16 shown prior to insertion of filler means 18 and 19 around wire bundle 30. In the prior art cable clamp assembly of FIG. 1, the filler means between the looped clamp portions 14 and 16 and wire bundle 30 is shown to comprise semi-grommets 18 and 19 which are purchased to fit specific cable clamp dimensions and wire bundle diameters. In such approach to filling the cross-sectional region between looped clamp portions 14 and 16 and the internal wire bundle 30, a great number of an inventory of sizes of semi-grommets 18 and 19 are required to accommodate all the variations which may be encountered. In some cases filler means 18 and 19 instead of comprising semi-grommets as shown may comprise an integral single grommet structure. The end view shown in FIG. 2 further illustrates the problem of insertion of proper fitting size semi-grommets 18 and 19 within looped clamp portions 14 and 16, viz., there must be an exact fit by selection of the suitable grommet sizes.

In order to overcome the aforementioned problem of precise grommet size selection, a further approach has been utilized in the prior art as shown in FIGS. 3 and 4. In FIGS. 3 and 4, it can be seen that a continuous tape 32 is wrapped around wire bundle 30 until the desired cross-sectional area is obtained (see FIG. 4). This method is costly since requiring long lengths of high-cost tape which require more time to apply compared to the semi-grommet insertion approach of FIGS. 1 and 2. A further disadvantage of the tape winding approach of FIG. 3 is that the assembled tape winding of FIG. 3 provides a stack about wire bundle 30 which is highly susceptible to telescoping action away from the stack and along the length of the wire bundle 30 thereby defeating the objective.

A solution to the problems presented by the prior art grommet selection and fit dissatisfactions of FIGS. 1 and 2 assemblies and the telescoping problems presented by the tape build-up techniques shown in FIGS. 3 and 4 is seen in the present solution of anti-telescoping cable clamp assemblies exemplified in FIGS. 5 through 8. In FIG. 5, there is shown a strip of resilient material 100 which provides a channel between the bottom portion 101 and upward and outwardly extending side-wall portions 102 and 103. Strip 100 of resilient material may comprise a fluorosilicone compound which is resistant to aircraft environment fluids and further does not require adhesives as the tape denoted by the numeral 32 and shown in FIG. 3. Adhesives are not required on strip 100 of resilient material because of the side gussets 102 and 103 which form the channel and stabilize the stack of windings shown in more detail in FIG. 8. Upward and outwardly extending side-wall portions 102 and 103 provide the side gussets which form a natural track for the tape to follow and further prevent telescoping as seen in the stacked winding shown in cross section in FIG. 8. Turning now to FIG. 6, it can be seen that a coiled section of strip 100 configured as shown in FIG. 5 provides the build-up necessary to act as filler material between wire bundle 30 and looped clamp portions 14 and 16. An end view of the anti-telescoping cable clamp assembly of FIG. 6 is shown in FIG. 7 with looped clamp portions 14 and 16 secured. Returning now to FIG. 5, it should be noted that the angle A formed between the outer side-wall surface 102 and the bottom of flat channel forming center region 101 of strip 100 is an acute angle sufficient to provide desired tracking. The angle A is required to be in the range of 60 to 90 degrees, preferably about 60 degrees. If the angle A is less than about 60 degrees then strip 100 of resilient material is insufficient to provide the desired tracking, and if greater than 90 degrees would cause increased difficulty and care in attempting a stacked build-up as shown in FIG. 8 since side-wall portions would begin to interfere with the achievement of a stacked assembly. While a desired and minimum angle A of 60 degrees has been indicated for the tape shown in FIG. 5, it will be appreciated that the flexibility of tape, including side-wall portions 102 and 103, leads to a finished angle A of somewhat less than 60 degrees, e.g., about 40 degrees, upon compression of the flexible tape as seen in FIG. 8.

The aforementioned and herein above-described embodiment of the present invention is illustrative of the invention hereinafter claimed in which, we claim:

1. An anti-telescoping cable clamp assembly for a wire bundle comprising in combination:

clamp means including generally opposing first and second loop clamp portions for surrounding and supporting said wire bundle;

filler means disposed between said clamp means and said wire bundle, said filler means including a coiled strip of resilient material having a flat bottom portion concentrically wound about said wire bundle in a stack, said strip of resilient material having side gussets forming a track for preventing lateral telescoping of said stack along the length of said wire bundle.

2. The invention according to claim 1 wherein said flat bottom portion has inner and outer surfaces and said gussets have outer side-wall portion that form an angle of 60 to 90 degrees with the outer surface of said flat bottom portion.

3. The invention according to claim 1 wherein said wire bundle defines a control axis longitudinally therethrough and said gussets have outer side-wall portions which form an angle of less than about 60 degrees with the control axis of said wire bundle upon compression of said filler structure within said clamp means.

* * * * *